United States Patent
Kang et al.

(10) Patent No.: US 11,810,231 B2
(45) Date of Patent: Nov. 7, 2023

(54) ELECTRONIC DEVICE AND METHOD FOR EDITING CONTENT OF EXTERNAL DEVICE

(71) Applicant: Samsung Electronics Co., Ltd., Suwon-si (KR)

(72) Inventors: Donggoo Kang, Suwon-si (KR); Changwon Kim, Suwon-si (KR); Hyunjin Kim, Suwon-si (KR); Chanwoong Park, Suwon-si (KR); Imkyeong You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 17/309,954

(22) PCT Filed: Dec. 27, 2019

(86) PCT No.: PCT/KR2019/018563
§ 371 (c)(1),
(2) Date: Jul. 2, 2021

(87) PCT Pub. No.: WO2020/141808
PCT Pub. Date: Jul. 9, 2020

(65) Prior Publication Data
US 2022/0076465 A1    Mar. 10, 2022

(30) Foreign Application Priority Data

Jan. 4, 2019    (KR) .................. 10-2019-0001080

(51) Int. Cl.
G06T 11/60    (2006.01)
G06T 7/73    (2017.01)
H04W 4/029    (2018.01)
G06V 10/20    (2022.01)
G06V 20/00    (2022.01)

(52) U.S. Cl.
CPC ............... *G06T 11/60* (2013.01); *G06T 7/74* (2017.01); *G06V 10/255* (2022.01); *G06V 20/00* (2022.01);
(Continued)

(58) Field of Classification Search
CPC ............ G06T 11/60; G06T 7/74; G06V 20/00
(Continued)

(56) References Cited

U.S. PATENT DOCUMENTS 9,692,866 B2    6/2017    Kim et al.
9,710,968 B2 *  7/2017    Dillavou ............... G06T 19/006
(Continued)

FOREIGN PATENT DOCUMENTS

KR    10-2010-0022428 A    3/2010
KR    v2015-0128765 A    11/2015
(Continued)

OTHER PUBLICATIONS

International Search Report and Written Opinion of the International Searching Authority in connection with International Application No. PCT/KR2019/018563 dated Apr. 22, 2020, 10 pages.
(Continued)

*Primary Examiner* — Thomas J Lett

(57) ABSTRACT

An electronic device according to various embodiments may include a camera circuit, a communication circuit, a display, a memory storing instructions, and a processor, configured to identify, in response to a user input, an object from content being displayed on the display, display, through the display, the object superimposed on an image being obtained through the camera circuit, wherein the image includes at least part of different content being displayed through a different electronic device, receive, while the object is being displayed, information on the different content being displayed by the different electronic device from the different
(Continued)

electronic device through the communication circuit, determine a location of the object to be included in the different content, based on the image being obtained and the information on the different content, and transmit, in response to receiving of a specified input, information on the object and information on the location so that the object is included at the location in the different content.

15 Claims, 17 Drawing Sheets

(52) U.S. Cl.
CPC ... *H04W 4/029* (2018.02); *G06T 2207/30204* (2013.01)
(58) Field of Classification Search
USPC .......................................................... 345/633
See application file for complete search history.

(56) References Cited

U.S. PATENT DOCUMENTS

| | | | |
|---|---|---|---|
| 9,756,673 B2 | 9/2017 | Dong et al. | |
| 9,984,485 B2* | 5/2018 | Osada | G06F 3/017 |
| 10,171,751 B2 | 1/2019 | Wathington | |
| 10,482,673 B2* | 11/2019 | Dillavou | G06T 19/006 |
| 2011/0047458 A1 | 2/2011 | Toledano et al. | |
| 2014/0247207 A1* | 9/2014 | Pahud | G06F 1/1698 |
| | | | 345/156 |
| 2017/0230616 A1 | 8/2017 | Vartiainen et al. | |
| 2017/0347227 A1 | 11/2017 | Stattenfield et al. | |
| 2019/0050068 A1 | 2/2019 | Pahud et al. | |
| 2019/0295216 A1* | 9/2019 | Suitoh | G06T 5/006 |
| 2019/0377482 A1 | 12/2019 | Shin et al. | |
| 2021/0103366 A1* | 4/2021 | Behzadi | H04L 67/55 |
| 2022/0076194 A1* | 3/2022 | Darnell | G06Q 10/083 |

FOREIGN PATENT DOCUMENTS

| | | |
|---|---|---|
| KR | 10-2017-0006591 A | 1/2017 |
| KR | 10-2017-0037431 A | 4/2017 |
| KR | 10-1759349 B1 | 7/2017 |
| KR | 10-2018-0017638 A | 2/2018 |

OTHER PUBLICATIONS

Korean Intellectual Property Office, "Office Action," dated May 11, 2023, in connection with Korean Patent Application No. 10-2019-0001080, 11 pages.

* cited by examiner (A)

(B)

(C)

(A)

(B)

ELECTRONIC DEVICE AND METHOD FOR EDITING CONTENT OF EXTERNAL DEVICE

CROSS-REFERENCE TO RELATED APPLICATIONS

This application is a 371 National Stage of International Application No. PCT/KR2019/018563, filed Dec. 27, 2019, which claims priority to Korean Patent Application No. 10-2019-0001080, filed Jan. 4, 2019, the disclosures of which are herein incorporated by reference in their entirety.

BACKGROUND

1. Field

Various embodiments described below relate to an electronic device of editing content of an external device, and an operating method thereof.

2. Description of Related Art

An electronic device may transmit and receive data with an external electronic device by using wired and wireless interfaces. The electronic device may interwork with the external electronic device to display content in the external electronic device.

SUMMARY

An electronic device may interwork with an external electronic device to display content in the external electronic device. In order to display the content at a desired location in the interworking external electronic device, a user of the electronic device may be required to control the interworking external electronic device. Accordingly, a method for facilitating user convenience may be required by providing functions for displaying content at a desired location in the external electronic device interworking with the electronic device.

Technical problems to be achieved in the disclosure are not limited to the technical problems mentioned above, and other technical problems not mentioned herein can be clearly understood by those skilled in the art to which the disclosure pertains from the following descriptions.

An electronic device according to various embodiments may include a camera circuit, a communication circuit, a display, a memory storing instructions, and a processor configured to identify, in response to a user input, an object from content being displayed on the display, display, through the display, the object superimposed on an image being obtained through the camera, wherein the image includes at least part of different content being displayed through a different electronic device, receive, while the object is being displayed, information on the different content being displayed by the different electronic device from the different electronic device through the communication circuit, determine a location of the object to be included in the different content, based on the image being obtained and the information on the different content, and transmit, in response to receiving of a specified input, information on the object and information on the location so that the object is included at the location in the different content.

A method of operating an electronic device according to various embodiments may include identifying, in response to a user input, an object from content being displayed in the electronic device, displaying the object superimposed on an image being obtained by the electronic device, wherein the image includes at least part of different content being displayed by a different electronic device, receiving, while the object is being displayed, information on the different content being displayed by the different electronic device from the different electronic device, determining a location of the object to be included in the different content, based on the image being obtained and the information on the different content, and transmitting, in response to receiving of a specified input, information on the object and information on the location so that the object is included at the location in the different content.

An electronic device and method according to various embodiments can provide functions for displaying content at a desired location in an external electronic device interworking with the electronic device.

Advantages acquired in the disclosure are not limited to the aforementioned advantages. Other advantages not mentioned herein can be clearly understood by those skilled in the art to which the disclosure pertains from the following descriptions.

DETAILED DESCRIPTION

Figure 1:
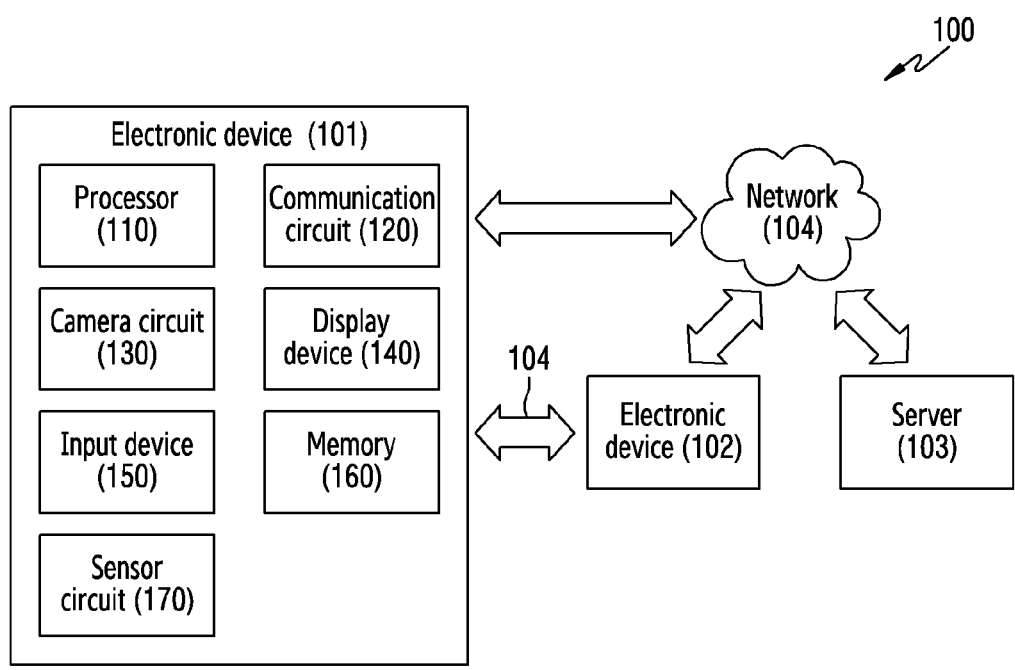
FIG. 1 is a block diagram of an electronic device in a network environment according to various embodiments.

FIG. 1 is a block diagram of an electronic device 101 in a network environment 100 according to various embodiments.

Referring to FIG. 1, in various embodiments, the electronic device 101 may communicate with an electronic device 102 via a first network 104 (e.g., a short-range wireless communication network), or may communication with the electronic device 102 or a server 103 via a second network 105 (e.g., a long-range wireless communication network).

In various embodiments, the electronic device 101 may include a processor 110, a communication circuit 120, a camera circuit 130, a display device 140, an input device 150, a memory 160, or a combination thereof. In various embodiments, in addition to these components, one or more other components (e.g., a sensor circuit) may be added in the electronic device 101. In various embodiments, some of the components may be implemented as single integrated circuitry.

In various embodiments, the processor 110 may execute software (e.g., a program) to control at least one other component (e.g., a hardware or software component) of the electronic device 101 coupled with the processor 110, and may perform various data processing or computation.

In various embodiments, the processor 110 may extract an object included in content being displayed on the display device 140 in response to a user input (e.g., a touch input). In various embodiments, the content may include an image, an electronic document, a video, or a combination thereof. In various embodiments, the object may include an image object, a text object, a data object, or a combination thereof. In various embodiments, the image object may be an identifiable shape (e.g., a shape of puppy or person) included in the content. In various embodiments, the text object may be an identifiable text included in the content. In various embodiments, the data object may include: information included in metadata of the content (e.g., a webpage address included in metadata of a screenshot image indicating a webpage); information indicated by an image object, text object, or combination of such object of the content; or a combination of such information. In various embodiments, when the image object of the content indicates a discount coupon, the data object for the image object may include a recognizable discount code, discount period, discount product, or combination thereof included in the discount coupon. In various embodiments, when the text object of the content indicates a Uniform Resource Locator (URL), the data object for the text object may include instructions for accessing the URL.

In various embodiments, the processor 110 may obtain an image by activating the camera circuit 130 in response to the user input (e.g., the touch input). In various embodiments, the processor 110 may display the image being obtained by the camera circuit 130, through the display device 140. In various embodiments, the processor 110 may superimpose an extracted object on the image being obtained by the camera circuit 130 and display the image having the extracted object superimposed thereon through the display device 140. In various embodiments, the processor 110 may superimpose the extracted object on a set location of the image being obtained by the camera circuit 130 (e.g., a location on an image corresponding to a set location of the image sensor of the camera circuit 130). In various embodiments, the set location of the image may be a center location (e.g., a location on the image corresponding to a center location of the image sensor of the camera circuit 130).

In various embodiments, in response to the user input (e.g., the touch input), the processor 110 may edit an object displayed through the display device 140 by being superimposed on the image being obtained by the camera circuit 130. In various embodiments, in response to a signal detecting that the electronic device 101 is tilted through the sensor circuit 170, the processor 110 may rotate the object, and may display the rotated object through the display device 140 by superimposing the object on the image being obtained by the camera circuit 130. In various embodiments, in response to a signal detecting that the electronic device 101 is rotated through the sensor circuit 170, the processor 110 may reverse the object (e.g., left-and-right reversion, up-and-down reversion), and may display the reversed object through the display device 140 by superimposing the object on the image being obtained by the camera circuit 130.

In various embodiments, in response to the user input (e.g., the touch input), the processor 110 may control the communication circuit 120 to transmit the content being displayed on the display device 140 to the server 103. In various embodiments, the processor 110 may control the communication circuit 120 to receive information on an object included in the content or objects related to the object included in the content from the server 103. In various embodiments, the objects related to the objects included in the content may be objects determined to be similar to objects recognized in the content by the server 103. In various embodiments, when the server 103 recognizes an object indicating a puppy in the content, an object indicating a puppy of the same or similar breed as the puppy indicated by the object, an object indicating a puppy taking the same or similar pose as the puppy indicated by the object, or a combination thereof may be determined as a related object.

In various embodiments, in response to the user input (e.g., the touch input), the processor 110 may control the communication circuit 120 to establish a connection with the electronic device 102. In various embodiments, the processor 110 may control the communication circuit 120 so as to be coupled with the electronic device 102 via the first network 104 or the second network 105. In various embodiments, when the electronic device 101 is coupled with the server 103 via the second network 105 and the electronic device 102 is coupled with the server 103 via the second network 105, it may be evaluated that the electronic device 101 and the electronic device 102 are coupled with each other through the server 103.

In various embodiments, the processor 110 may request the electronic device 102 for information on different content being displayed by the electronic device 102, and may control the communication circuit 120 to receive the information on the different content from the electronic device 102. In various embodiments, the different content may be an image, a text, a video, or a combination thereof. In various embodiments, the information on the different content may include data for displaying the different content on the display device 140, a type of data input fields (e.g., an address input window, a text input field, an image input field) included in the different content, information on an application used when the different electronic device 102 displays the different content, whether an identifier (e.g., a binary code) is superimposed on the different content, a value indicated by the identifier superimposed on the different content, information on a location on the different content on which the identifier is superimposed, or a combination thereof. In various embodiments, the electronic device 102 may transmit the information on the different content to the server 103.

In various embodiments, the processor 110 may determine the location of the different content being displayed by the electronic device 102, based on the image being obtained through the camera circuit 130. In various embodiments, the processor 110 may determine the location of the different content being displayed by the electronic device 102, based on the image being obtained through the camera circuit 130 and the information on the different content. In various embodiments, the image being obtained through the camera circuit 130 may be an image to be obtained by capturing at least part of the different content being displayed by the electronic device 102. In various embodiments, the processor 110 may determine a location of at least part of the different content, by comparing the image being obtained through the camera circuit 130 with the different content being displayed by the electronic device 102. However, the disclosure is not limited thereto. In various embodiments, the processor 110 may transmit to the server 103 the image being obtained through the camera, and may request the server 103 to determine the location of the different content being displayed by the electronic device 102 and indicated by the image being obtained through the camera circuit 130. In various embodiments, the processor 110 may request the server 103 to determine the location, and thus may determine the location of the different content being displayed by the electronic device 102, based on the image being obtained through the camera circuit 130.

In various embodiments, the processor 110 may set a virtual identification line on the image being obtained through the camera circuit 130, and may determine the location of the different content being displayed by the electronic device 102, based on the set virtual identification line. In various embodiments, when the different image indicating all or at least some regions of the display device of the electronic device 102 is obtained through the camera circuit 130, the virtual identification line may be an identifier which is set by the electronic device 101 on the basis of the different image and is superimposed on the display device 140.

In various embodiments, the processor 110 may recognize an identifier being displayed in a superimposed manner by the display device of the electronic device 102 in the image being obtained through the camera circuit 130, and may determine the location of the different content being displayed by the electronic device 102, based on the recognized identifier. In various embodiments, the identifier may be a binary code (e.g., a Quick Response (QR) code). In various embodiments, the identifier may be displayed on a layer of the different content being displayed by the display device of the electronic device 102. In various embodiments, the identifier may be distinguished from the different content.

In various embodiments, in response to the user input (e.g., the touch input), the processor 1120 may control the communication circuit 120 to transmit, to the electronic device 102, information on an extracted object and information on the location such that the extracted object is included at a determined location of the different content. In various embodiments, the processor 120 may request the server 103 to transmit, to the electronic device 102, information on the object, information on the location, or a combination thereof.

As described above, an operation in which the processor 110 extracts the object included in the content and requests to be included in the different content of the electronic device 102 will be described below with reference to FIG. 2 to FIG. 17.

In various embodiments, the communication circuit 120 may support establishing a direct (e.g., wired) communication channel or a wireless communication channel between the electronic device 101 and the external electronic device (e.g., the electronic device 102 or the server 103) and performing communication via the established communication channel. In various embodiments, the communication circuit 120 may include a wireless communication circuit (e.g., a cellular communication circuit, a short-range wireless communication circuit, or a Global Navigation Satellite System (GNSS) communication circuit) or a wired communication module (e.g., a Local Area Network (LAN) communication circuit or a Power Line Communication (PLC) circuit). A corresponding one of these communication modules may communicate with the external electronic device (e.g., the electronic device 102 or the server 103) via the first network 104 (e.g., a short-range communication network, such as Bluetooth, Wireless-Fidelity (Wi-Fi) direct, or Infrared Data Association (IrDA)) or the second network 105 (e.g., a long-range communication network, such as a cellular network, the Internet, or a computer network (e.g., LAN or Wide Area Network (WAN)).

The camera circuit 130 may capture still images and moving images. In various embodiments, the camera circuit 130 may include one or more lenses, image sensors, image signal processors, or flashes. In various embodiments, the camera circuit 130 may obtain information on a depth of the image.

The display device 140 may visually provide information to the outside (e.g., a user) of the electronic device 101. The display device 140 may include, for example, a display, a hologram device, or a projector and control circuitry to control a corresponding device. According to an embodiment, the display device 140 may include touch circuitry configured to detect a touch or sensor circuity (e.g., a pressure sensor) configured to measure the intensity of force incurred by the touch.

The input device 150 may receive a command or data to be used by a component (e.g., the processor 110) of the electronic device 101 from the outside (e.g., a user) of the electronic device 101. In various embodiments, the input device 150 may include a microphone, a mouse, a keyboard, a touch screen, or a combination thereof.

The memory 160 may store various data used by at least one component (e.g., the processor 110) of the electronic device 101. The data may include, for example, software (e.g., a program) and input data or output data for a command related thereto. In various embodiments, the memory 160 may include a volatile memory or a non-volatile memory.

The sensor circuit 170 may detect an operational state (e.g., power or temperature) of the electronic device 101 or an external environmental state (e.g., a user state), and may generate an electrical signal or data value corresponding to the detected state. According to an embodiment, the sensor circuit 170 may include, for example, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, or an illuminance sensor.

In various embodiments, the electronic device 102 may include the same components as the electronic device 101. In various embodiments, the electronic device 102 may be implemented as a device including a display device, such as a television, a Personal Computer (PC), a smartphone, and a refrigerator.

In various embodiments, the server 103 may perform a process corresponding to a request from the electronic device 101 and then transmit a result thereof to the electronic device 101, the electronic device 102, or a combination thereof.

Figure 2:
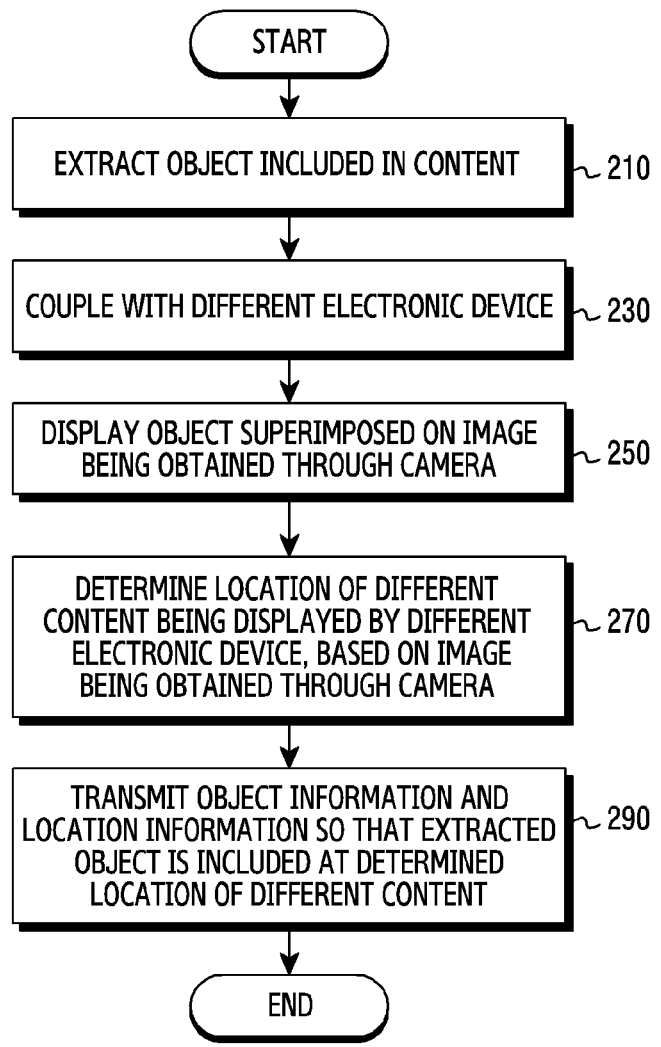
FIG. 2 illustrates an operation of an electronic device according to various embodiments.

FIG. 2 illustrates an operation of the electronic device 101 according to various embodiments. FIG. 2 will be described with reference to the components of the electronic device 101 of FIG. 1.

Figure 3:
FIG. 3 illustrates various examples of an object included in an image being displayed in an electronic device according to various embodiments.
Figure 3:
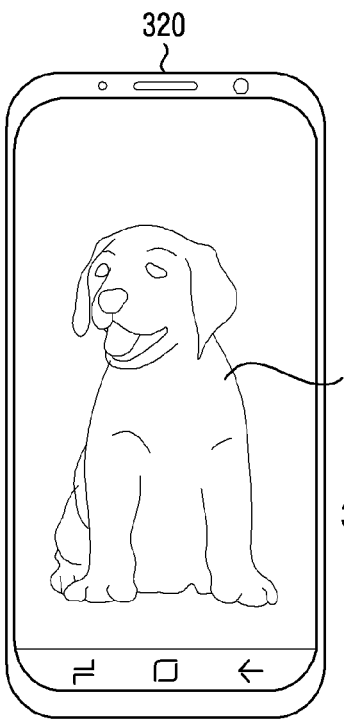
Figure 3:
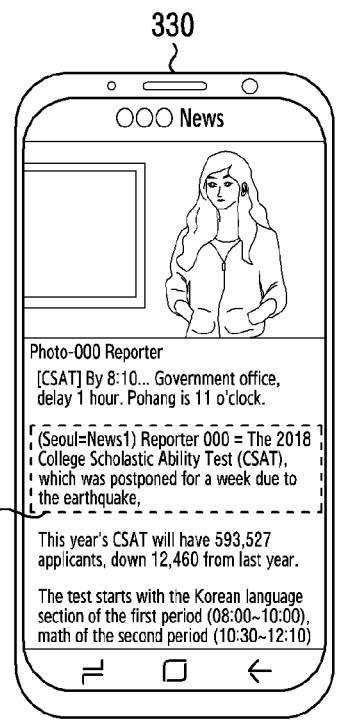
Figure 3:
Figure 3:
Figure 3:
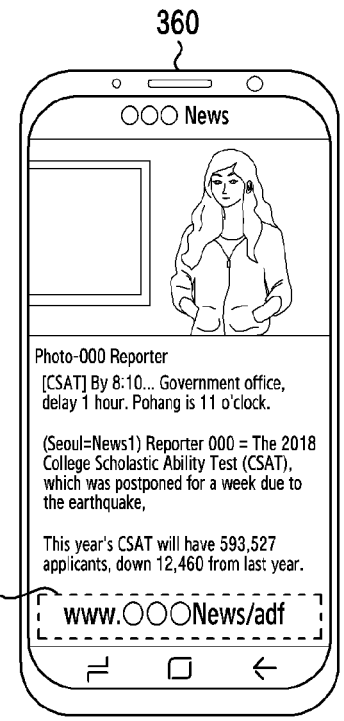

FIG. 3 illustrates objects 311, 321, 331 341, 351, and 361 included in images being displayed in electronic devices 310, 320, 330, 340, 350, and 360 according to various embodiments. The electronic devices 310, 320, 330, 340, 350, and 360 of FIG. 3 may be included in the electronic device 101 of FIG. 1.

Referring to FIG. 2, in operation 210, the processor 110 of the electronic device 101 may extract an object included in content. In various embodiments, the processor 110 may extract an object included in content being displayed on the display device 140. In various embodiments, the processor 110 may extract one or more objects from the content. In various embodiments, the object included in the content may be an image (e.g., an image including depth information obtained through the camera circuit 130, a Portable Network Graphic (PNG) image), a text (e.g., a text included in a text file, a text included in an image in an image format), or data (e.g., a Uniform Resource Locator (URL), a discount code). The operation 210 will be described below with reference to FIG. 4 and FIG. 5.

In various embodiments, the object included in the content may include the image object 311 having a shape of people included in an image shown on a screen being displayed in the electronic device 310 of FIG. 3(A), the image object 321 having a shape of a puppy included in an image shown on a screen being displayed in the electronic device 320 of FIG. 3(B), the text object 331 included in a webpage shown on a screen being displayed in the electronic device 330 of FIG. 3(C), the text object 341 included in a newspaper image shown on a screen being displayed in the electronic device 340 of FIG. 3(D), the data object 351 included in an image (e.g., a coupon image) shown on a screen being displayed in the electronic device 350 of FIG. 3(E), the data object 361 included in a webpage shown on a screen being displayed in the electronic device 360 of FIG. 3(F), or a combination thereof. In various embodiments, the image shown on the screen being displayed in the electronic device 310 of FIG. 3(A) may be an image including depth information obtained through the camera circuit 130. In various embodiments, the image shown on the screen being displayed in the electronic device 320 of FIG. 3(B) may be a PNG image. In various embodiments, the text object 331 included in the webpage shown on the screen being displayed in the electronic device 330 of FIG. 3(C) may be texts selected by a user's input. In various embodiments, the text object 341 included in the newspaper image shown on the screen being displayed in the electronic device 330 of FIG. 3(D) may be texts that can be extracted by the processor 110 from an image by performing Optical Character Recognition (OCR). In various embodiments, the data object 351 included in the image (e.g., coupon image) shown on the screen being displayed in the electronic device 330 of FIG. 3(E) may be data that can be extracted by the processor 110 on the basis of metadata included in the image and the OCR. In various embodiments, the data object 361 included in the webpage shown on the screen being displayed in the electronic device 360 of FIG. 3(F) may be data (e.g., webpage address) that can be extracted from the webpage. However, the object included in the content is not limited thereto.

Referring to FIG. 2, in operation 230, the processor 110 of the electronic device 101 may be coupled with a different electronic device (e.g., the electronic device 102). In various embodiments, the processor 110 of the electronic device 101 may be coupled with the different electronic device (e.g., the electronic device 102) by using the communication circuit 120. In various embodiments, the processor 110 of the electronic device 101 may be coupled with the different electronic device (e.g., the electronic device 102), based on a user input related to content being displayed. In various embodiments, the user input related to the content being displayed may be a touch input for a button (e.g., an icon) displayed at a specific location of the content. In various embodiments, based on the user input, the processor 110 of the electronic device 101 may transmit a connection request to the different electronic device (e.g., the electronic device 102) indicated by the button (e.g., the icon) displayed at the specific location of the content and may receive a response for the request, thereby being coupled with the different electronic device (e.g., the electronic device 102). The operation 230 will be described below with reference to FIG. 6 and FIG. 7.

Referring to FIG. 2, in operation 250, the processor 110 of the electronic device 101 may display on the display device 140 an object superimposed on an image being obtained through the camera circuit 130. In various embodiments, the processor 110 of the electronic device 101 may superimpose the object extracted in the operation 210 on the image being obtained through the camera circuit 130, and may display the object superimposed on the image on the display device 140. In various embodiments, the processor 110 of the electronic device 101 may superimpose the object on the image so that a center of the object is located at a center of the image being obtained through the camera circuit 130. In various embodiments, the processor 110 of the electronic device 101 may superimpose the object on the image so that the center of the object is located at the center of the display device 140. In various embodiments, the processor 110 of the electronic device 101 may superimpose an object, which is superimposed on a first location of the image, on a second location of the image on the basis of a user input. The operation 250 will be described below with reference to FIG. 8 and FIG. 9.

Referring to FIG. 2, in operation 270, the processor 110 of the electronic device 101 may determine a location on different content being displayed by the different electronic device (e.g., the electronic device 102), based on an image being obtained through the camera circuit 130. The operation 270 will be described below with reference to FIG. 8 to FIG. 13.

Referring to FIG. 2, in operation 290, the processor 110 of the electronic device 101 may transmit object information and location information so that the extracted object is included at the determined location of the different content. In various embodiments, the processor 110 of the electronic device 101 may transmit the object information and the location information to the different electronic device (e.g., the electronic device 102). The operation 290 will be described below with reference to FIG. 14 and FIG. 15.

Figure 4:
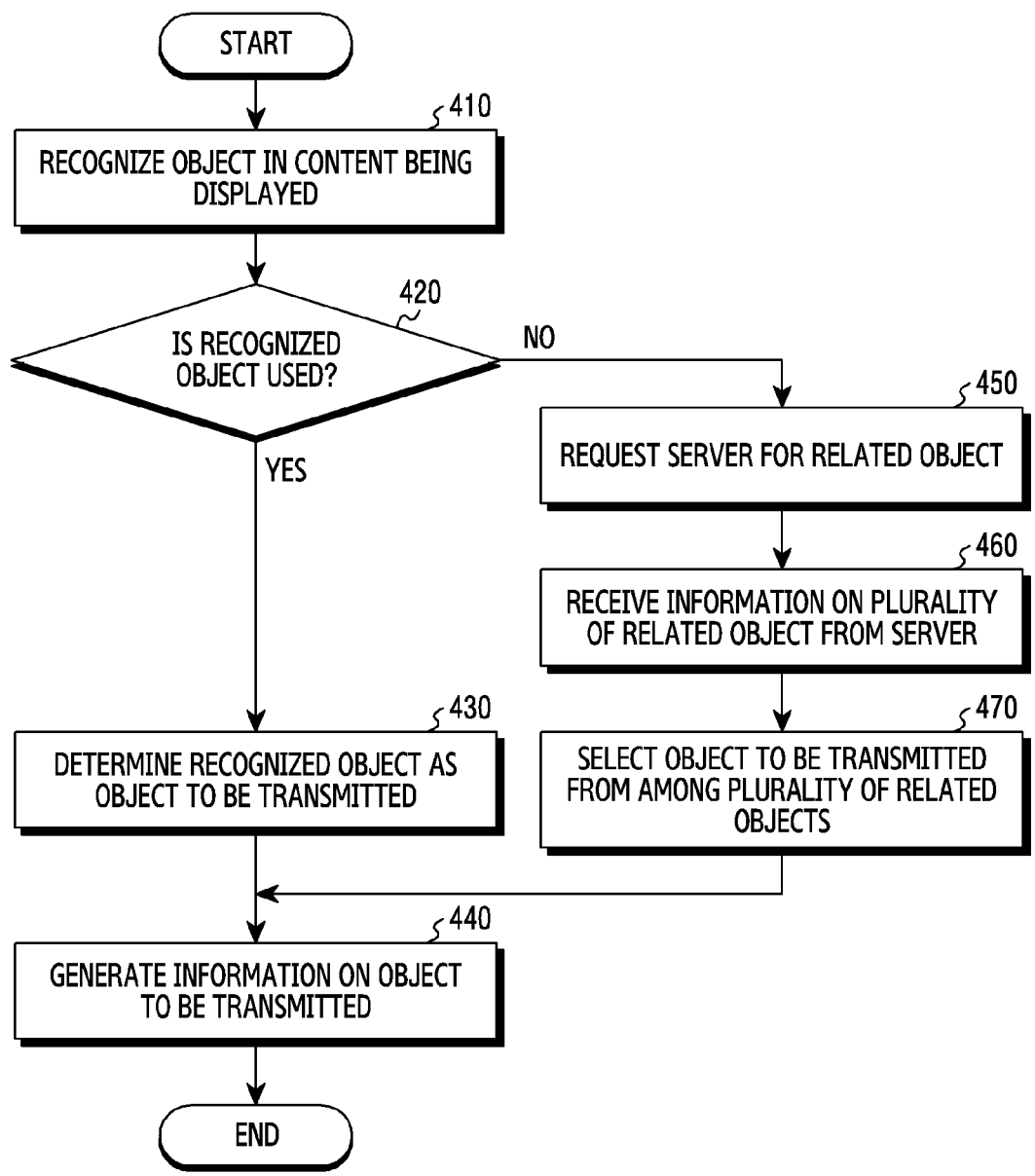
FIG. 4 illustrates an operation of an electronic device according to various embodiments.

FIG. 4 illustrates an operation of the electronic device 101 according to various embodiments. Operations of the electronic device 101 of FIG. 4 may be included in the operation 210 of the electronic device 101 of FIG. 2. FIG. 4 will be described with reference to the components of the electronic device 101 of FIG. 1.

Figure 5:
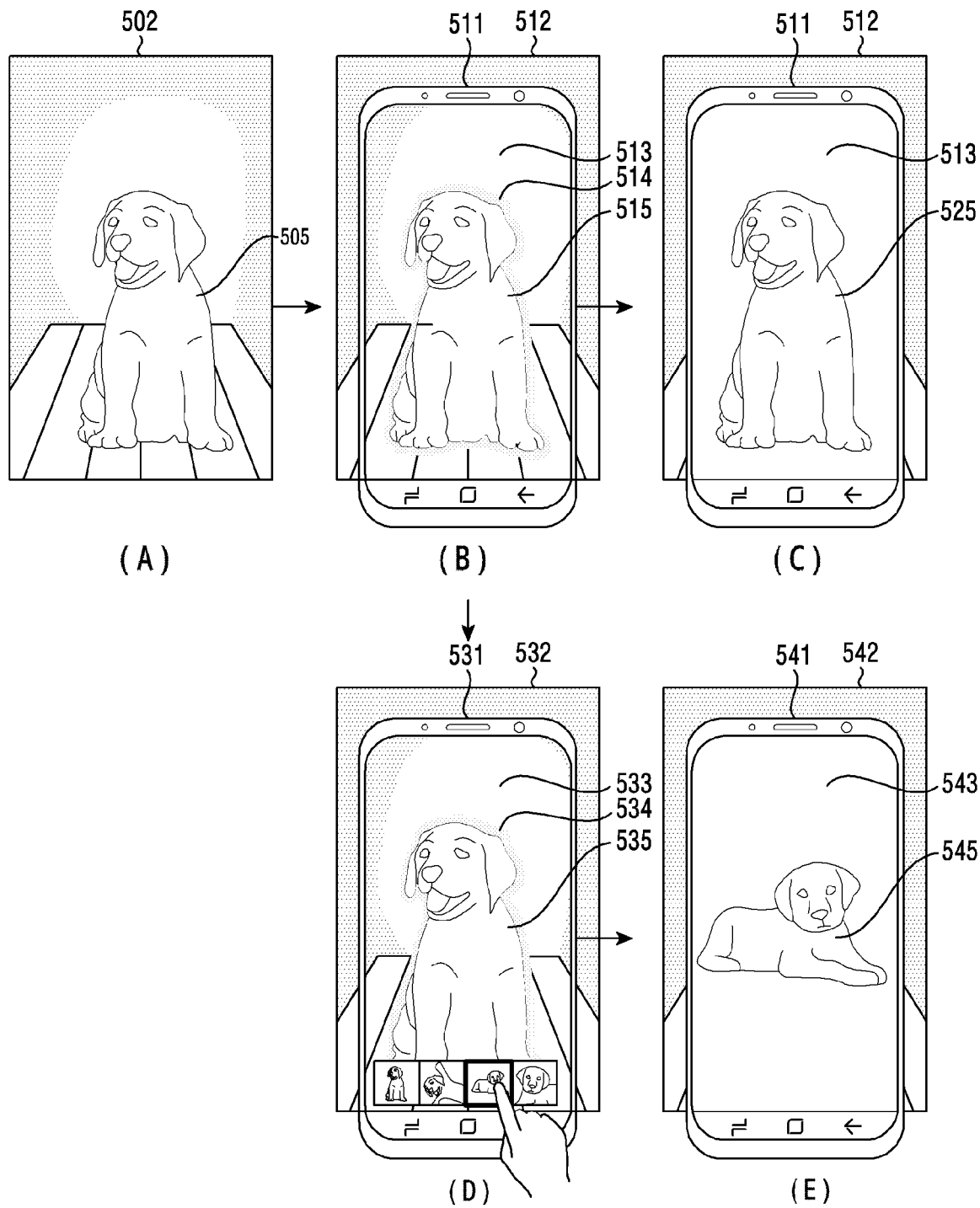
FIG. 5 illustrates various examples of an operation in which an electronic device extracts an object according to various embodiments.

FIG. 5 illustrates various examples 502, 512, 522, 532, and 542 of an operation in which electronic devices 511, 521, 531, and 541 extract an object according to various embodiments. The electronic devices 511, 521, 531, and 541 of FIG. 5 may be included in the electronic device 101 of FIG. 1.

Referring to FIG. 4, in operation 410, the processor 110 of the electronic device 101 may recognize an object included in content being displayed on the display device 140. In various embodiments, the processor 110 of the electronic device 101 may recognize one or more objects in the content being displayed on the display device 140. In various embodiments, the processor 110 of the electronic device 101 may recognize an image object, a text object, a data object, or a combination thereof. In various embodiments, the data object may be an object indicating information that can be extracted from the image object, the text object, or the combination thereof.

FIG. 5(A) illustrates a puppy 505 sitting on the floor. In various embodiments, referring to FIG. 5(B), a user may capture the puppy sitting on the floor, by using the electronic device 511 of the user. Referring to FIG. 5(B), an image including a puppy object 515 captured by the user by using the electronic device 511 of the user may be displayed on a display device of the electronic device 511. In various embodiments, the electronic device 511 may identify a background image 513 and the puppy object 515, by recognizing a region 514 including the puppy object 515 in the image.

Referring to FIG. 4, in operation 420, the processor 110 of the electronic device 101 may determine whether to use the recognized object. In various embodiments, the processor 110 of the electronic device 101 may determine whether to use the recognized object, based on a user input. In various embodiments, the user input may be an input corresponding to a signal for selecting at least one object from among one or more objects recognized in the content.

Referring to FIG. 4, if the processor 110 of the electronic device 101 determines to use the recognized object in operation 420 (YES), operation 430 may be performed. Referring to FIG. 4, if the processor 110 of the electronic device 101 determines not to use the recognized object in operation 420 (NO), operation 450 may be performed.

Referring to FIG. 5, when the electronic device 511 is in a situation of FIG. 5(B), the situation may be changed to a situation of FIG. 5(C) or a situation of FIG. 5(D), based on a user input. When it is determined to use the puppy object 515 recognized by the electronic device 511 in the situation of FIG. 5(B), the situation of FIG. 5(C) may occur. When it is determined not to use the puppy object 515 recognized by the electronic device 511 in the situation of FIG. 5(B), the situation of FIG. 5(D) may occur.

Referring to FIG. 4, in operation 430, the processor 110 of the electronic device 101 may determine the recognized object as an object to be transmitted. In various embodiments, the processor 110 of the electronic device 101 may determine the object recognized to be used based on the user input as the object to be transmitted to an external electronic device (e.g., the electronic device 102).

Referring to FIG. 4, in operation 440, the processor 110 of the electronic device 101 may generate information on the object to be transmitted to the external electronic device (e.g., the electronic device 102). In various embodiments, the information on the object to be transmitted may include data for displaying the object on the display device 140, a type and size of the object, or a combination thereof.

Referring to FIG. 5(C), the electronic device 521 may generate information on a puppy object 525. In various embodiments, information on a background 523 may be omitted in the information on the puppy 525. In various embodiments, the electronic device 521 may generate the information on the puppy object 525, so that only the puppy object 525 is displayed on the display device 140. In various embodiments, when the electronic device 521 generates the information on the puppy object 525, the camera circuit 130 may stop obtaining an image for a space 522, and the display device 140 may display the puppy object 525.

Referring to FIG. 4, in operation 450, the processor 110 of the electronic device 101 may request the server 103 for a related object. In various embodiments, the processor 110 of the electronic device 101 may transmit content being displayed on the display device 140 to the server 103, and thus may request the server 103 for the related object of an object included in the content being displayed on the display device 140. In various embodiments, the processor 110 of the electronic device 101 may transmit an object recognized in the content being displayed on the display device 140 to the server 103, and thus may request the server 103 for the related object of the object included in the content being displayed on the display device 140. In various embodiments, the related object may be objects similar to objects recognized in the content by the server 103. In various embodiments, when the server 103 recognizes an object indicating a puppy in the content, the server 103 may determine an object indicating a puppy of the same or similar breed as the puppy indicated by the object, an object indicating a puppy taking the same or similar pose as the puppy indicated by the object, or a combination thereof as a related object.

Referring to FIG. 4, in operation 460, the processor 110 of the electronic device 101 may receive information on a plurality of related objects from the server 103. In various embodiments, the information on the related object may include data for displaying the related object on the display device 140, a thumbnail image for the related object, a type and size of the related object, or a combination thereof.

Referring to FIG. 4, in operation 470, the processor 110 of the electronic device 101 may select an object to be transmitted from among the plurality of related objects. In various embodiments, the processor 110 of the electronic device 101 may select the object to be transmitted from among the plurality of related objects, based on a user input. In various embodiments, the processor 110 of the electronic device 101 may display a thumbnail image of each of the plurality of related objects in a specific region of the display device 140, and may select the object to be transmitted from among the plurality of related objects, based on the user input for selecting the thumbnail image for at least one related object from among the plurality of related objects.

Referring to FIG. 4, operation 440 may be performed after operation 470. In various embodiments, the processor 110 of the electronic device 101 may generate information on the selected related object.

Referring to FIG. 5(D), the electronic device 531 may transmit to the server 103 a background 533 of an image, a puppy object 535, a region 534 including the puppy object 535, or a combination thereof, and thus may display a thumbnail image indicating each of the plurality of related objects for the puppy object 535 received from the server 103 at a lower end of the display device 140. In various embodiments, a user of the electronic device 532 may select one thumbnail image from among a plurality of thumbnail images by using a finger of the user as an input means.

Referring to FIG. 5(E), the electronic device 541 may display a puppy object 545 corresponding to the selected thumbnail image through the display device 140. In various embodiments, a background 543 of the puppy object 545 may not exist.

Figure 6:
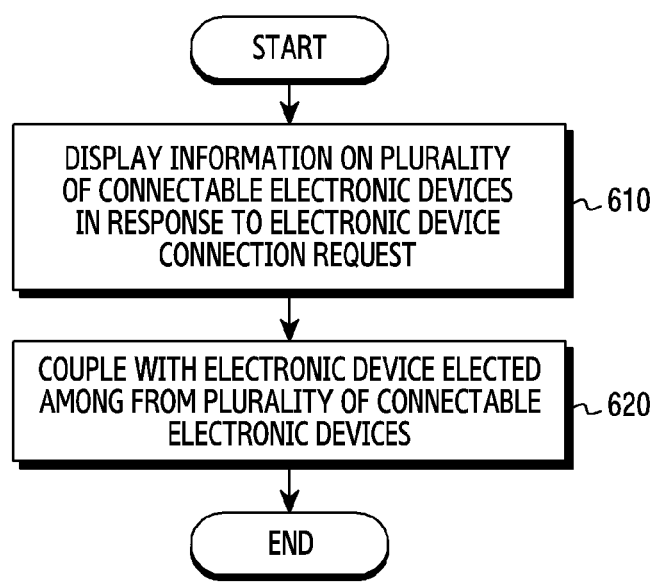
FIG. 6 illustrates an operation of an electronic device according to various embodiments.

FIG. 6 illustrates an operation of the electronic device 101 according to various embodiments. Operations of the electronic device 101 of FIG. 6 may be included in the operation 230 of the electronic device 101 of FIG. 2. FIG. 6 will be described with reference to the components of the electronic device 101 of FIG. 1.

Figure 7:
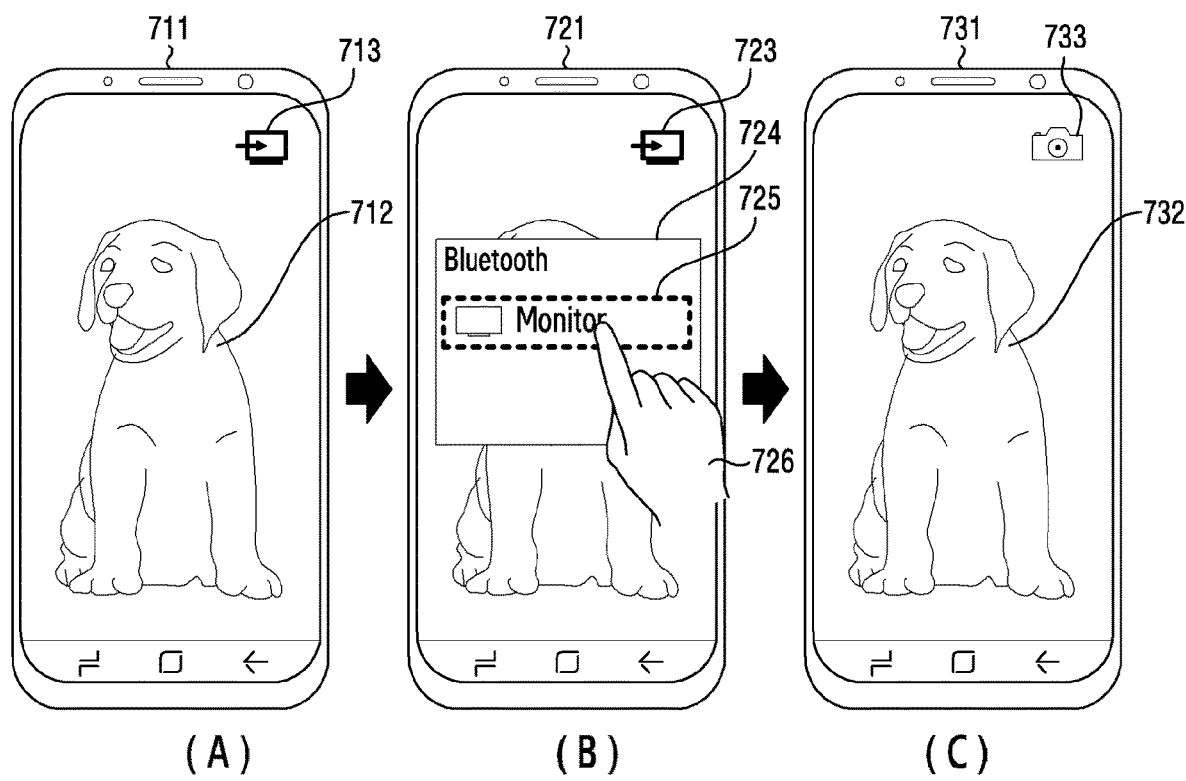
FIG. 7 illustrates an example of an operation in which an electronic device is coupled with a different electronic device according to various embodiments.

FIG. 7 illustrates an example of an operation in which electronic devices 711, 721, and 731 are coupled with other electronic devices according to various embodiments. The electronic devices 711, 721, and 731 of FIG. 7 may be included in the electronic device 101 of FIG. 1.

Referring to FIG. 6, in operation 610, the processor 110 of the electronic device 101 may display information (e.g., a connection name) on a plurality of connectable electronic devices (e.g., the electronic device 102) in response to an electronic device connection request. In various embodiments, in a situation where information on a selected object is generated and then the selected object is displayed on the display device 140, the processor 110 of the electronic device 101 may determine that the electronic device connection request is input, upon detecting a user input for an electronic device connection icon displayed at a specific location of the display device 140.

Referring to FIG. 7(A), the electronic device 711 displays a puppy object 712 and an electronic device connection icon 713 through the display device 140. Upon detecting a user input (e.g., a touch input) for the electronic device connection icon 713 in FIG. 7(A), as shown in FIG. 7(B), the electronic device 721 may display a layout 724 including information (e.g., a connection name) 725 on the connectable electronic device (e.g., the electronic device 102) on a layer indicating the puppy object 712 and an electronic device connection icon 723.

Referring to FIG. 6, in operation 620, the processor 110 of the electronic device 101 may be coupled with an electronic device selected from among the connectable electronic devices. In various embodiments, the processor 110 of the electronic device 101 may be coupled with an electronic device (e.g., the electronic device 102) selected by a user input, by using the communication circuit 120. In various embodiments, the communication circuit 120 of the electronic device 101 may be coupled with a different electronic device (e.g., the electronic device 102) through a short-range communication network (e.g., Bluetooth, WiFi direct, or IrDA). In various embodiments, when the processor 110 of the electronic device 101 is coupled with the selected electronic device (e.g., the electronic device 102), the electronic device connection icon may be changed to a camera icon. In various embodiments, when a user input for the camera icon is recognized, the processor 110 of the electronic device 101 may activate the camera circuit 130. In various embodiments, when the processor 110 of the electronic device 101 activates the camera circuit 130, an extracted object may be superimposed on an image being obtained through the camera circuit 130.

Referring to FIG. 7(B), when a user input 726 is recognized on the layout 724 being displayed through the display device 140, the electronic device 721 may be coupled with an electronic device (e.g., the electronic device 102) indicated by the user input 726. In various embodiments, as shown in FIG. 7(C), when the electronic device 731 is coupled with the selected electronic device (e.g., the electronic device 102), the electronic device connection icon 723 may be changed to a camera icon 733.

Figure 8:
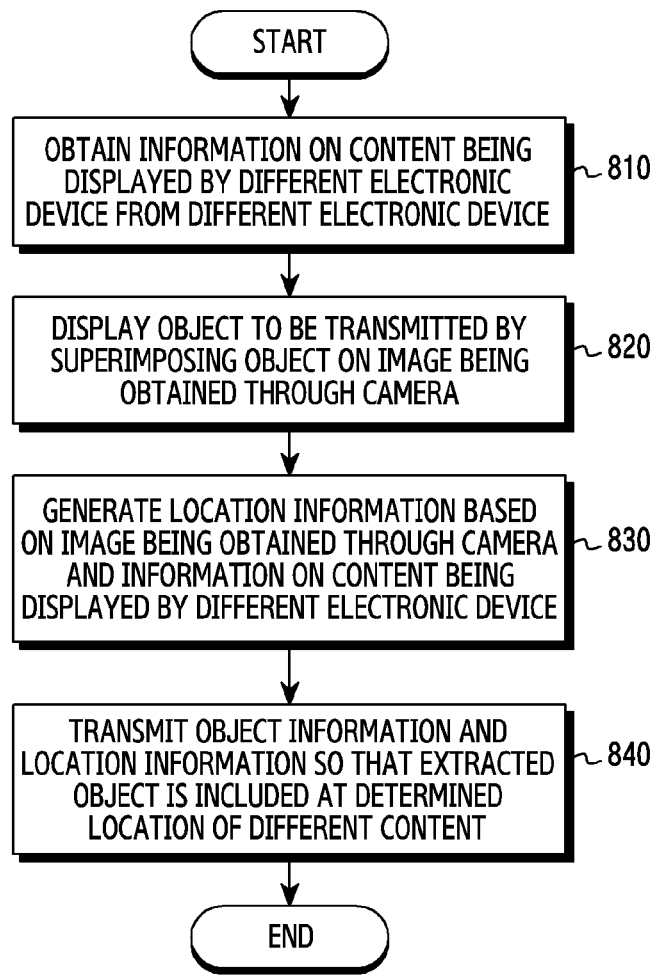
FIG. 8 illustrates an operation of an electronic device according to various embodiments.

FIG. 8 illustrates an operation of the electronic device 101 according to various embodiments. Operations of the electronic device 101 of FIG. 8 may be included in the operations 250 to 290 of the electronic device 101 of FIG. 2. FIG. 8 will be described with reference to the components of the electronic device 101 of FIG. 1.

Figure 9:
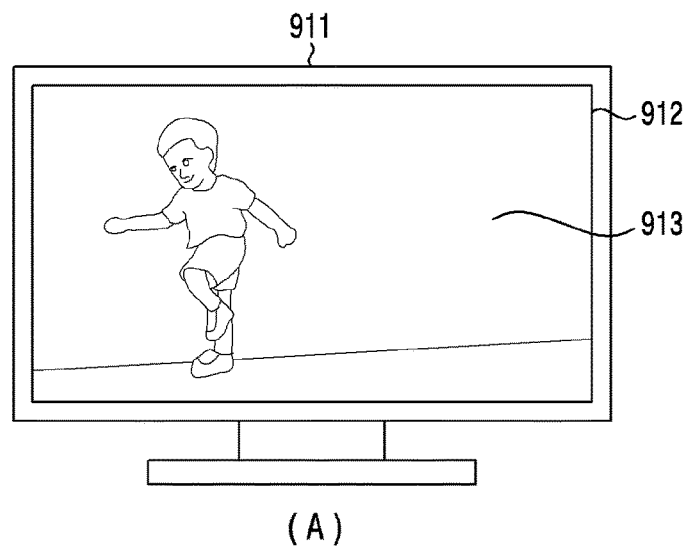
FIG. 9 illustrates an example of an operation in which an electronic device allows an extracted object to be included in content of a different electronic device according to various embodiments.
Figure 9:
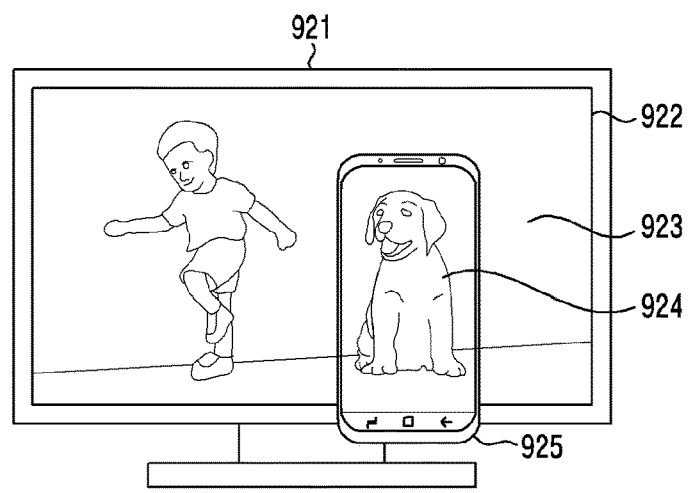
Figure 9:
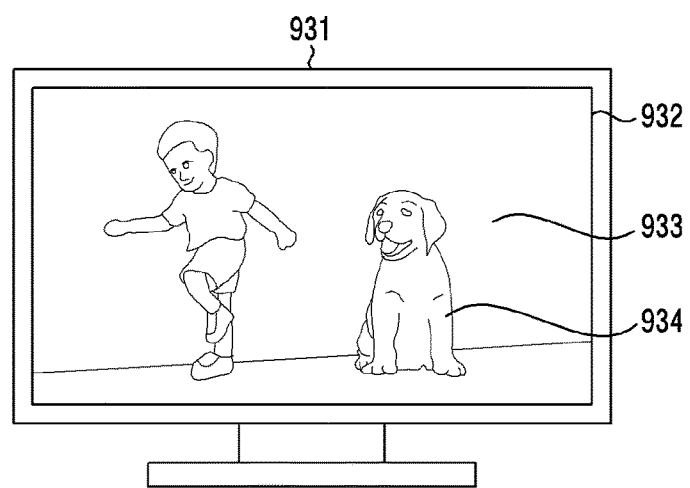

FIG. 9 illustrates an example of an operation in which an electronic device 925 allows an extracted object to be included in content of different electronic devices 911, 921, and 931 according to various embodiments.

Referring to FIG. 8, in operation 810, the processor 110 of the electronic device 101 may obtain information on different content being displayed by a different electronic device (e.g., the electronic device 102) from the different electronic device (e.g., the electronic device 102). In various embodiments, the different content being displayed by the different electronic device (e.g., the electronic device 102) may be an image, a text, a video, or a combination thereof. In various embodiments, the information on the different content may include whether an identifier (e.g., a binary code) is superimposed on the different content, a value indicated by the identifier superimposed on the different content, information on a location on the different content on which the identifier is superimposed, or a combination thereof.

Referring to FIG. 9(A), when the different electronic device 911 displays an image 913 including an image object indicating a child on a display device 912, the different electronic device 911 may transmit information on the image 913 indicating the child, information on an application for displaying the image 913 on the display device 912, or a combination thereof to the electronic device (e.g., 101) (or the server 103).

Referring to FIG. 8, in operation 820, the processor 110 of the electronic device 101 may display an object to be transmitted by superimposing the object on an image being obtained through the camera circuit 130. In various embodiments, the processor 110 may display the to-be-transmitted object on the display device 140 by superimposing the object on the image being obtained after activating the camera circuit 130 in response to a user input (e.g., a touch input). In various embodiments, the processor 110 may superimpose an extracted object on a set location of the image being obtained by the camera circuit 130. In various embodiments, the image being obtained through the camera circuit 130 may include at least part of different content obtained through the camera circuit 130 and being displayed by a different electronic device (e.g., the electronic device 102).

Referring to FIG. 9(B), when the different electronic device 921 displays an image 923 including an image object indicating a child on a display device 922, a user may allow the camera circuit 130 of the electronic device 925 to face the display device 922, so that the camera circuit 130 of the electronic device 925 obtains an image including at least part of the display device 922. Referring to FIG. 9(B), the electronic device 925 may superimpose an image object 924 indicating a puppy on the image obtained by the camera circuit 130 of the electronic device 925 and including at least part of the display device 922 and may represent this through the display device 140.

Referring to FIG. 8, in operation 830, the processor 110 of the electronic device 101 may generate location information, based on an image being obtained through the camera circuit 130 and information on different content being displayed by the different electronic device (e.g., the electronic device 102).

Referring to FIG. 8, in operation 840, the processor 110 of the electronic device 101 may transmit object information and location information so that the extracted object is included at a determined location of the different content. In various embodiments, the processor 110 of the electronic device 101 may transmit the object information and the location information to the different electronic device (e.g., the electronic device 102 or the server 103). In various embodiments, by transmitting the object information and the location information to the different electronic device (e.g., the electronic device 102), the server 103 may request the different electronic device (e.g., the electronic device 102) so that the extracted object is included at the determined location of the different content.

Referring to FIG. 9(C), the different electronic device 931 may allow an image object 934 indicating a puppy to be included in an image 933 including the image object indicating the child on a display device 932, based on the object information and location information obtained from the electronic device 925. Referring to FIG. 9(C), the display device 932 of the different electronic device 931 may display the image 933 including the image object 934 and the image object indicating the child.

Figure 10:
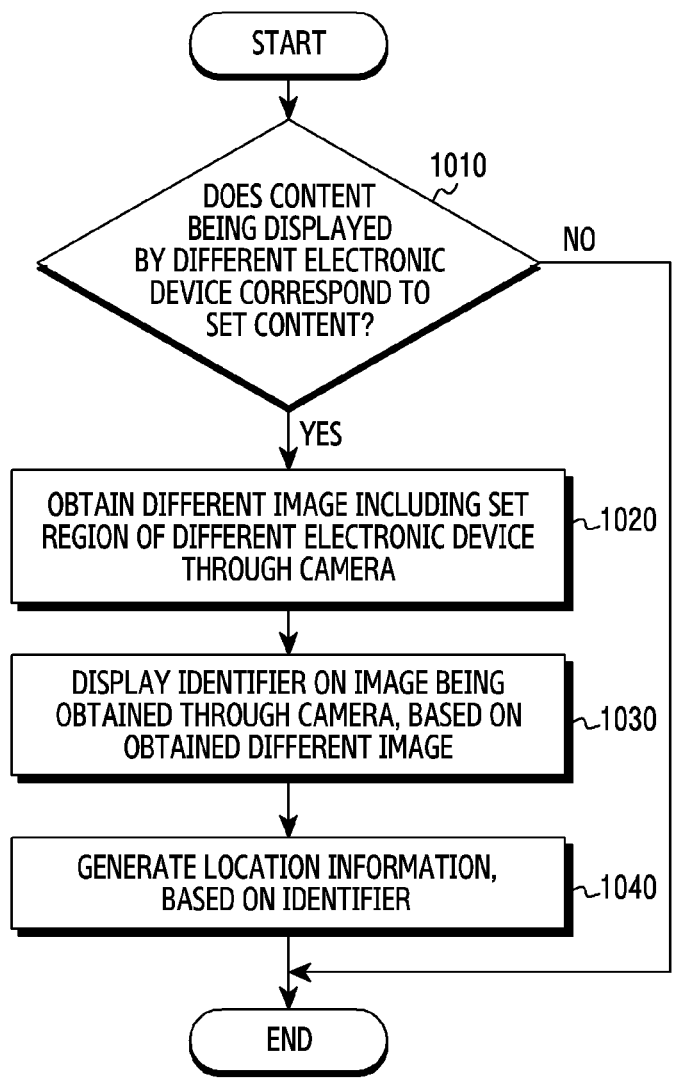
FIG. 10 illustrates an operation of an electronic device according to various embodiments.

FIG. 10 illustrates an operation of the electronic device 101 according to various embodiments. Operations of the electronic device 101 of FIG. 10 may be included in the operations 270 of the electronic device 101 of FIG. 2 or the operations 820 and 830 of the electronic device 101 of FIG. 8. FIG. 10 will be described with reference to the components of the electronic device 101 of FIG. 1.

Figure 11:
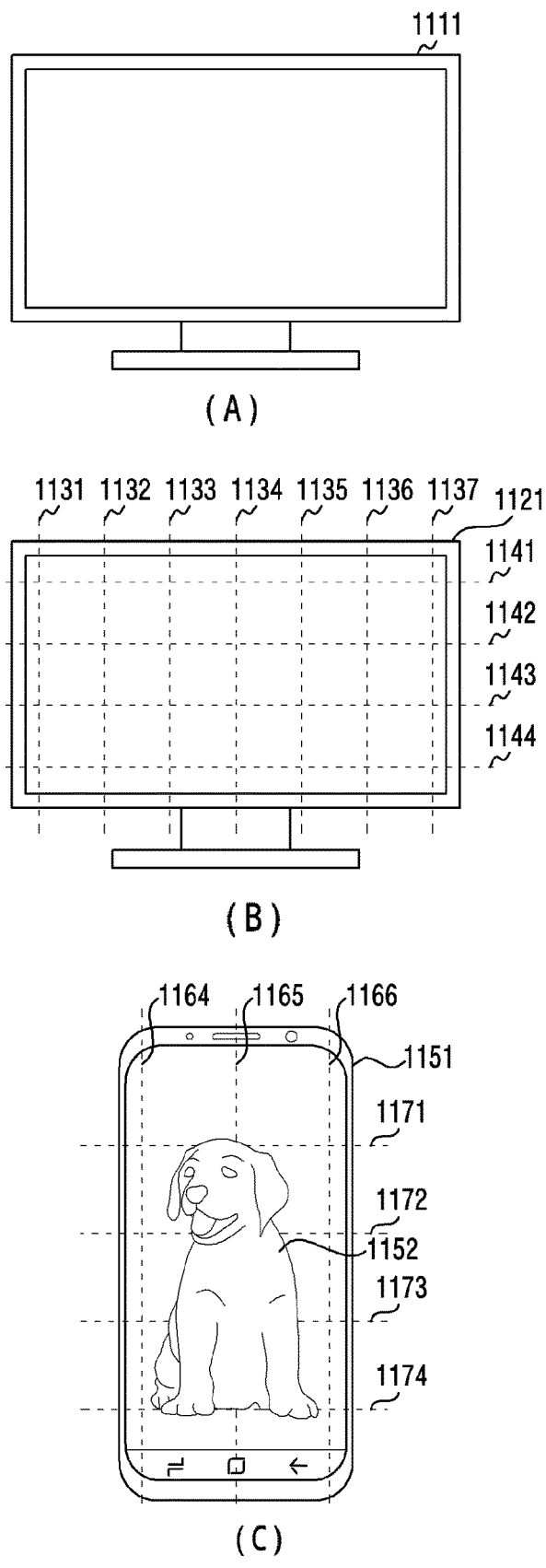
FIG. 11 illustrates an example of an operation in which an electronic device determines a location according to various embodiments.

FIG. 11 illustrates an example of an operation in which an electronic device determines a location according to various embodiments.

Referring to FIG. 10, in operation 1010, the processor 110 of the electronic device 101 may determine whether different content being displayed by a different electronic device (e.g., the electronic device 102) is set content. In various embodiments, the processor 110 of the electronic device 101 may determine whether the different content being displayed by the different electronic device (e.g., the electronic device 102) is the set content, based on information on the different content received from the different electronic device (e.g., the electronic device 102). In various embodiments, the set content may be content of monochrome (e.g., white), content having a repeated pattern (e.g., a repeated hatched pattern), or a combination thereof.

Referring to FIG. 10, if the processor 110 of the electronic device 101 determines that the different content being displayed on the different electronic device (e.g., the electronic device 102) is the set content in operation 1010 (YES), operation 1020 may be performed. Referring to FIG. 10, if the processor 110 of the electronic device 101 determines that the different content being displayed on the different electronic device (e.g., the electronic device 102) is not the set content in operation 1010 (NO), the process based on FIG. 10 may end.

Referring to FIG. 11(A), when a screen being displayed by a different electronic device 1111 displays the content of monochrome (e.g., white), an electronic device 1151 may determine that different content being displayed by the different electronic device 1111 is set content.

Referring to FIG. 10, in operation 1020, the camera circuit 130 of the electronic device 101 may obtain a different image including a set region of a different electronic device (e.g., the electronic device 102). In various embodiments, the processor 110 of the electronic device 101 may control the camera circuit 130 so that the camera circuit 130 obtains the different image including the set region of the different electronic device. In various embodiments, the processor 110 of the electronic device 101 may display a set guidance phrase (e.g., "Please move back so that the entire screen can be recognized") on the display device 140, and thus may request a user to control the electronic device 101 so that the camera circuit 130 obtains the different image including the set region of the different electronic device (e.g., the electronic device 102). In various embodiments, the set region of the different electronic device (e.g., the electronic device 102) may be a region including the entirety or part of the display device of the different electronic device (e.g., the electronic device 102).

Referring to FIG. 10, in operation 1030, the processor 110 of the electronic device 101 may display an identifier on an image being obtained through the camera circuit 130, based on the obtained different image. In various embodiments, the identifier may be a virtual identification line (or figure, code) represented on the image in the display device 140 of the electronic device 101. In various embodiments, the identifier may be a virtual identification line (or figure) represented in a region indicating a display device of the different electronic device (e.g., the electronic device 102) in an image being obtained through the camera circuit 130.

Referring to FIG. 11(B), when an image 1121 including the entirety of the display device of the different electronic device 1111 is obtained through the camera circuit 130, the electronic device 1151 may set virtual identification lines 1131 to 1137 and 1141 to 1144 in a region indicating the display device of the image 1121, based on a characteristic (e.g., an outer region of the different electronic device 1111) of the display device indicated by the image 1121. In various embodiments, when the image obtained through the camera circuit 130 in the electronic device 1151 indicates a partial region of the displayable image 1121, the identification lines 1131 to 1137 set in the partial region of the image 1121 may be displayed on the display device 140.

Referring to FIG. 10, in operation 1040, the processor 110 of the electronic device 101 may generate location information on the basis of the identifier. In various embodiments, when an image obtained through the camera circuit 130 indicates a partial region of an obtained different image, the processor 110 of the electronic device 101 may identify identification lines set in the partial region among the set identification lines, and may generate location information, based on a location of the identified identification lines.

Referring to FIG. 11(C), a partial region of the image 1121 including the entirety of the display device of the different electronic device 1111 may be obtained through the camera circuit 130, and the electronic device 1151 may display the obtained partial region. In various embodiments, the electronic device 1151 may identify identification lines 1164 to 1166 and 1171 to 1174 being displayed on the display device 140 for the partial region. In various embodiments, the electronic device 1151 may identify a location of the identified identifications 1164 to 1166 and 1171 to 1174, based on that the identified identification lines 1164 to 1166 and 1171 to 1174 correspond to the identification lines 1134 to 1136 and 1141 to 1144 of the image 1121. In various embodiments, the electronic device 1151 may generate location information of an image object 1152 indicating a puppy, based on a location of the identified identifications 1164 to 1166 and 1171 to 1174.

Figure 12:
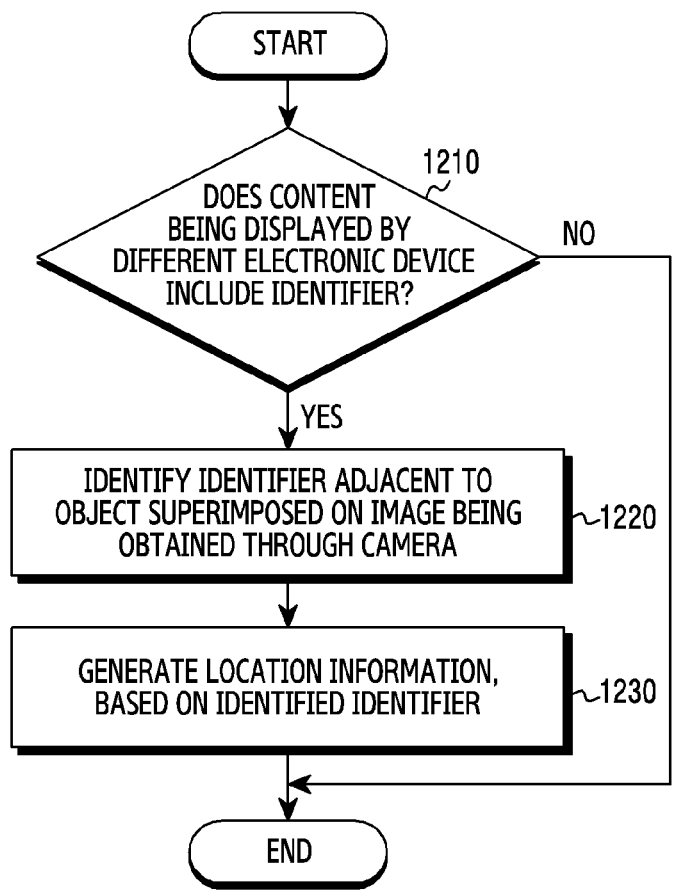
FIG. 12 illustrates an operation of an electronic device 101 according to various embodiments.

FIG. 12 illustrates an operation of the electronic device 101 according to various embodiments. Operations of the electronic device 101 of FIG. 12 may be included in the operations 270 of the electronic device 101 of FIG. 2 or the operations 820 and 830 of the electronic device 101 of FIG. 8. FIG. 12 will be described with reference to the components of the electronic device 101 of FIG. 1.

Figure 13:
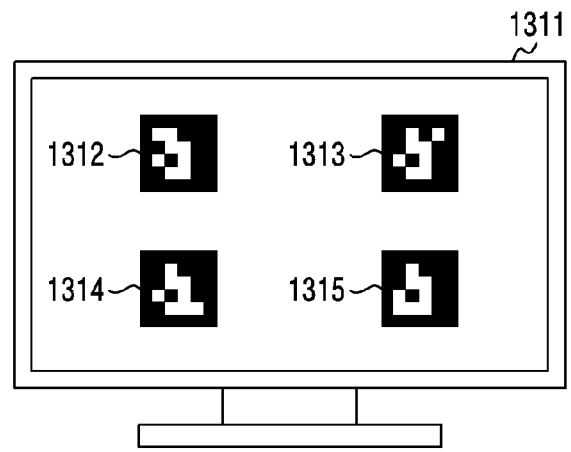
FIG. 13 illustrates an example of an operation in which an electronic device determines a location according to various embodiments.
Figure 13:
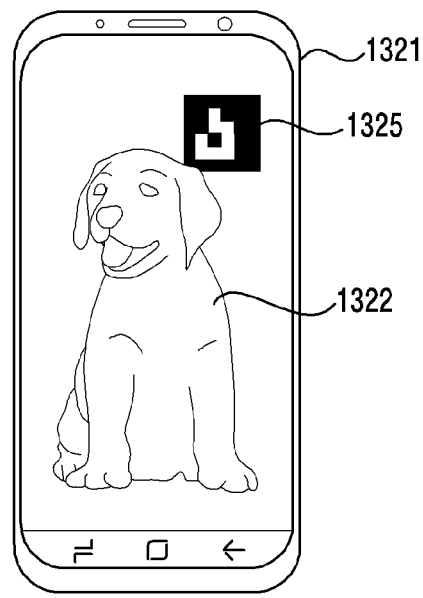

FIG. 13 illustrates an example of an operation in which an electronic device determines a location according to various embodiments.

Referring to FIG. 12, in operation 1210, the processor 110 of the electronic device 101 may determine whether different content being displayed on a different electronic device (e.g., the electronic device 102) includes an identifier. In various embodiments, the processor 110 of the electronic device 101 may determine whether the different content includes the identifier, based on information on the different content obtained from the different electronic device (e.g., the electronic device 102). In various embodiments, the identifier may be an object superimposed on the different content being displayed after the different electronic device (e.g., the electronic device 102) is coupled with the electronic device 102. In various embodiments, the identifier may be a code such as a binary code (e.g., a Quick Response (QR) code).

Referring to FIG. 12, if the processor 110 of the electronic device 101 determines that the different content being displayed on the different electronic device (e.g., the electronic device 102) includes the identifier in operation 1210 (YES), operation 1220 may be performed. Referring to FIG. 12, if the processor 110 of the electronic device 101 determines that the different content being displayed on the different electronic device (e.g., the electronic device 102) does not include the identifier in operation 1210 (NO), the process based on FIG. 12 may end.

Referring to FIG. 13(A), a different electronic device 1311 may further display identifiers 1312 to 1315 on a screen being displayed.

Referring to FIG. 12, in operation 1220, the processor 110 of the electronic device 101 may identify an identifier adjacent to an object superimposed on an image being obtained through the camera circuit 130. In various embodiments, the processor 110 of the electronic device 101 may identify the identifier adjacent to the superimposed object among a plurality of identifiers that can be identified in the image being displayed through the camera circuit 130. In various embodiments, the identifier adjacent to the superimposed object may be an identifier having a coordinate closest to a center location of the superimposed object.

Referring to FIG. 12, in operation 1230, the processor 110 of the electronic device 101 may generate location information on the basis of the identified identifier. In various embodiments, the processor 110 of the electronic device 101 may generate the location information on the basis of a location at which the identifier adjacent identifier is superimposed on the different content.

Referring to FIG. 13(B), an electronic device 1321 may obtain an image including an identifier 1325 through the camera circuit 130. In various embodiments, the electronic device 1321 may identify the identifier 1325 included in the image obtained through the camera circuit 130, based on information on the different content obtained from the different electronic device 1311. In various embodiments, the electronic device 1321 may generate location information of an image object 1322 indicating a puppy, based on that the identifier 1325 included in the image corresponds to the identifier 1315.

Figure 14:
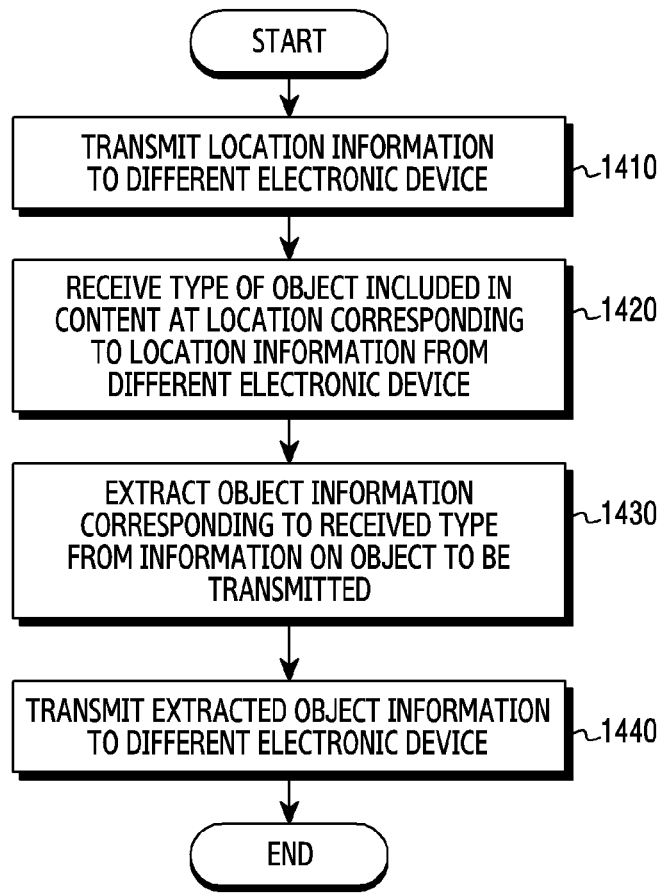
FIG. 14 illustrates an operation of an electronic device according to various embodiments.

FIG. 14 illustrates an operation of the electronic device 101 according to various embodiments. Operations of the electronic device 101 of FIG. 14 may be included in the operation 290 of the electronic device 101 of FIG. 2 or the operation 840 of the electronic device 101 of FIG. 8. FIG. 14 will be described with reference to the components of the electronic device 101 of FIG. 1.

Figure 15:
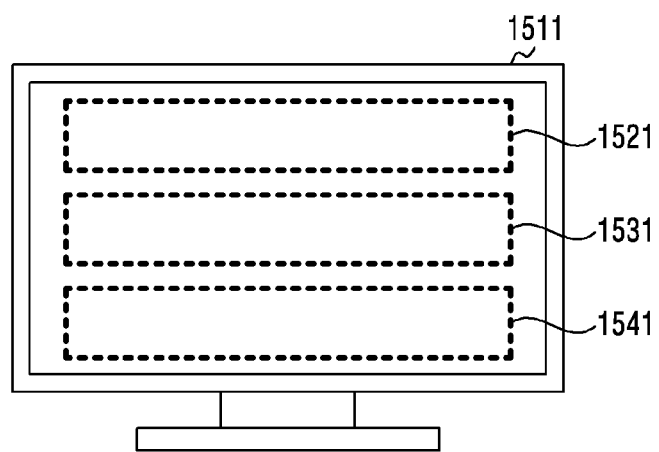
FIG. 15 illustrates an example of a screen being displayed on a different electronic device.

FIG. 15 illustrates an example of a screen being displayed on a different electronic device 1511.

Referring to FIG. 14, in operation 1410, the processor 110 of the electronic device 101 may transmit location information to a different electronic device (e.g., the electronic device 102). In various embodiments, the processor 110 of the electronic device 101 may request the server 103 to transmit the location information to the different electronic device (e.g., the electronic device 102). In various embodiments, the location information may be information calculated in the server 103.

Referring to FIG. 14, in operation 1420, the processor 110 of the electronic device 101 may receive information indicating a type of an object included in content at a location corresponding to the location information from the different electronic device (e.g., the electronic device 102). In various embodiments, the type of the object may indicate an object input type. In various embodiments, the information indicating the type of the object may indicate that at least one of an image object, a text object, and a data object may be included.

Referring to FIG. 15, an image being displayed on the external electronic device 1511 may include three objects 1521, 1531, and 1541. In various embodiments, the external electronic device 1511 may transmit information indicating a type of an object (e.g., the first object 1521) corresponding to the received location information among the objects 1521, 1531, and 1541 to the electronic device 101. In various embodiments, the information indicating the type of the object (e.g., the first object 1521) corresponding to the received location information may indicate information indicating that the image object may be included. In various embodiments, the information indicating the type of the object (e.g., the second object 1531) corresponding to the received location information may indicate information indicating that the text object may be included. In various embodiments, the information indicating the type of the object (e.g., the third object 1541) corresponding to the received location information may indicate information indicating that the data object may be included.

Referring to FIG. 14, in operation 1430, the processor 110 of the electronic device 101 may extract object information corresponding to the received type from information on an object to be transmitted. In various embodiments, when the information indicating the received type indicates that the image object may be included, the processor 110 of the electronic device 101 may extract data for displaying the object on the display device 140 from information on the object. In various embodiments, when the information indicating the received type indicates that a text object may be included, the processor 110 of the electronic device 101 may extract text from the information on the object. In various embodiments, when the information indicating the received type indicates that a data object may be included, the processor 110 of the electronic device 101 may extract data (e.g., URL, discount code) including the data object from the information on the object. In various embodiments, when data includes a plurality of pieces of information, the processor 110 of the electronic device 101 may extract information corresponding to input field information of an object corresponding to the received location information.

Referring to FIG. 14, in operation 1440, the processor 110 of the electronic device 101 may transmit the extracted object information to the different electronic device (e.g., the electronic device 102). In various embodiments, the processor 110 of the electronic device 101 may request the server 103 to transmit object information to the different electronic device (e.g., the electronic device 102).

Figure 16:
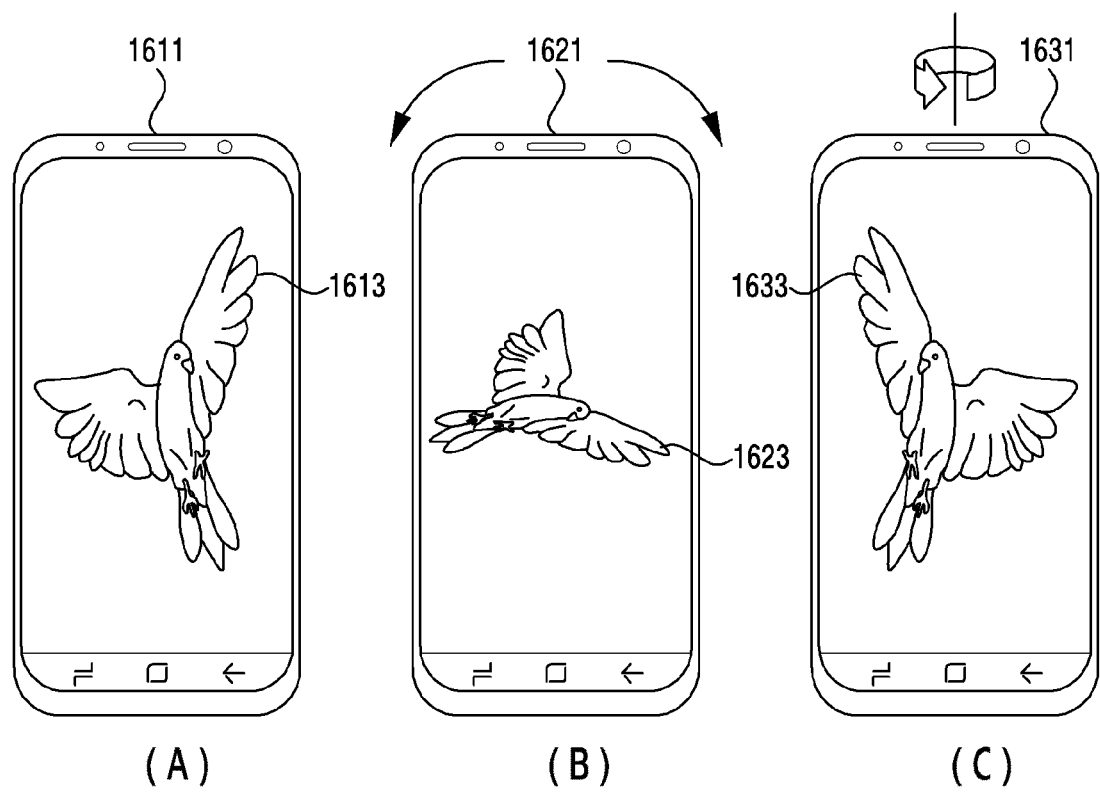
FIG. 16 illustrates an example of an operation in which an electronic device edits an object according to various embodiments.

FIG. 16 illustrates an example of an operation in which electronic devices 1611, 1621, and 1631 edit objects 1613, 1623, and 1633 according to various embodiments.

Referring to FIG. 16(A), the electronic device 1611 according to various embodiments may display the image object 1613 indicating a bird through the display device 140.

Referring to FIGS. 16(B) and (C), the electronic device 1611 may edit the image object 1613 indicating the bird on the basis of a user's input. In various embodiments, the user's input may be a signal input through the input device 150, a signal detected through the sensor circuit 170 (e.g., a signal for detecting a movement or shaking of the electronic device 101), or a combination thereof.

In various embodiments, when the sensor circuit 170 detects that the electronic device 1621 is shaken left and right, the electronic device 1621 may rotate the image object 1613 indicating the bird according to the shaking direction to edit the image object 1613. Referring to FIG. 16(B), the electronic device 1621 may display the image object 1623 rotated according to the shaking direction through the display device 140.

In various embodiments, when the sensor circuit 170 detects that the electronic device 1621 is shaken along a reference axis, the electronic device 1621 may reverse the image object 1613 indicating the bird according to the shaking direction to edit the image object 1613. Referring to FIG. 16(C), when it is detected that the electronic device 1631 is shaken along a vertical axis, the image object 1633 reversed about the vertical axis (e.g., left-and-right reversion) may be displayed through the display device 140. In various embodiments, when it is determined that the electronic device 1631 is shaken along a horizontal axis, an image object reversed about the horizontal axis (e.g., up-and-down reversion) may be displayed through the display device 140.

Figure 17:
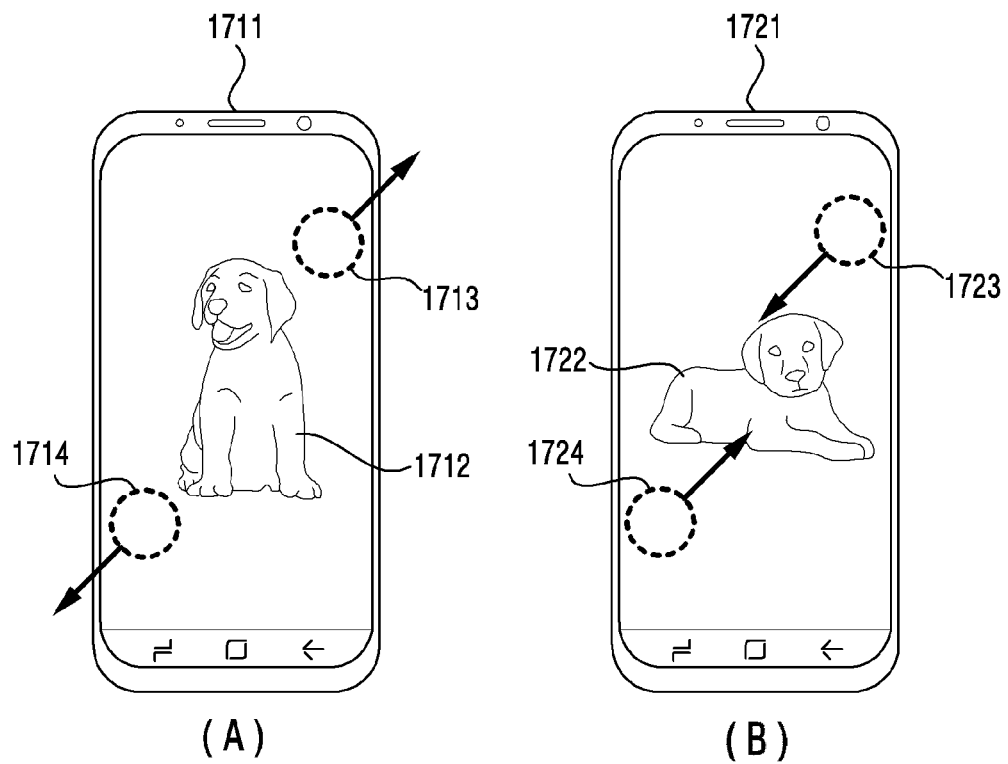
FIG. 17 illustrates an example of an operation in which an electronic device edits an object according to various embodiments.
Figure 17:
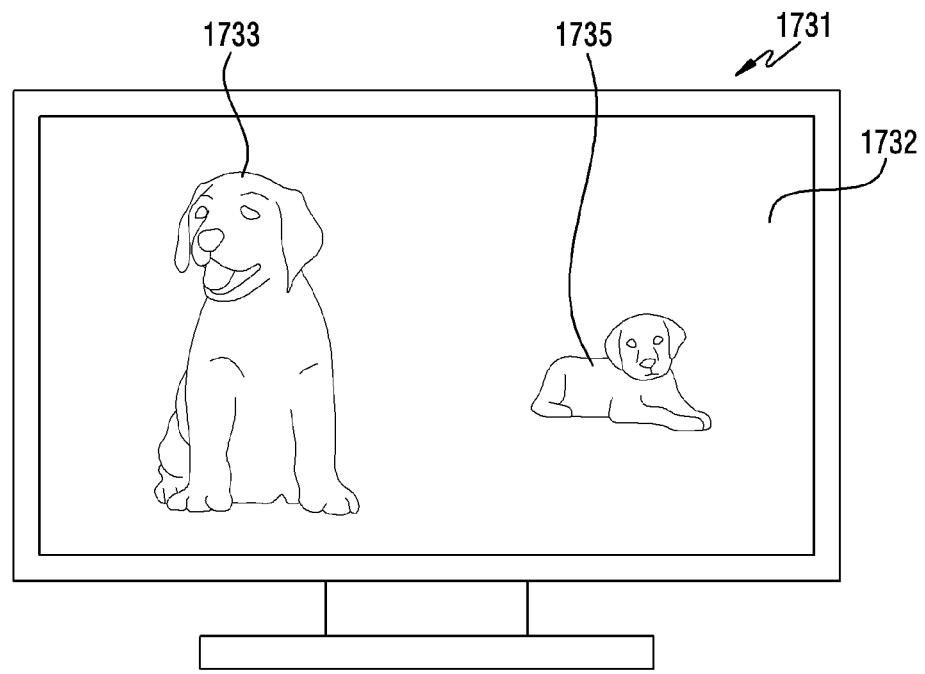

FIG. 17 illustrates an example of an operation in which electronic devices 1711 and 1721 edit objects 1712 and 1722 according to various embodiments.

Referring to FIG. 17(A), the electronic device 1711 according to various embodiments may display the first image object 1712 indicating a puppy through the display device 140. Referring to FIG. 17(A), the electronic device 1711 according to various embodiments may enlarge the first image object 1712 indicating the puppy on the basis of a user input. In various embodiments, the user input may be an input corresponding to a signal by which a distance between two points 1713 and 1714 becomes far during a touch input for the two points 1713 and 1714 is maintained. However, the disclosure is not limited thereto. In various embodiments, the electronic device 1711 may change a size of the first image object 1712, based on a distance between the electronic device 1711 and a display device of a different electronic device (e.g., the electronic device 102). In various embodiments, when the distance between the electronic device 1711 and the display device of the different electronic device (e.g., the electronic device 102) becomes close, the electronic device 1711 may reduce the size of the first image object 1712 in proportion thereto.

Referring to FIG. 17(B), the electronic device 1721 according to various embodiments may display the second image object 1722 indicating a puppy through the display device 140. Referring to FIG. 17(B), the electronic device 1721 according to various embodiments may reduce the second image object 1722 indicating the puppy on the basis of a user input. In various embodiments, the user input may be an input corresponding to a signal by which a distance between two points 1723 and 1724 becomes far during a touch input for the two points 1723 and 1724 is maintained. However, the disclosure is not limited thereto. In various embodiments, the electronic device 1721 may change a size of the second image object 1722, based on a distance between the electronic device 1721 and a display device of a different electronic device (e.g., the electronic device 102). In various embodiments, when the distance between the electronic device 1721 and the display device of the different electronic device (e.g., the electronic device 102) becomes far, the electronic device 1721 may enlarge the size of the second image object 1722 in proportion thereto.

Referring to FIG. 17(C), an external electronic device 1731 may superimpose a first image object 1733 indicating a puppy, of which a size is enlarged based on the editing for the first image object 1712 indicating the puppy in the electronic device 1711, and a second image object 1735 indicating a puppy, of which a size is reduced based on the editing for the second image object 1722 indicating the puppy in the electronic device 1721, on a screen 1732 being displayed.

As described above, the electronic device 101 according to various embodiments can provide functions for displaying content at a desired location in an external electronic device (e.g., the electronic device 102) interworking with the electronic device 101. As described above, the electronic device 101 according to various embodiments can provide functions for displaying content, selected from content being displayed by the electronic device 101, at a desired location of different content being displayed by the interworking external electronic device (e.g., the electronic device 102).

As described above, the electronic device 101 according to various embodiments may include a camera circuit, a communication circuit, a display, a memory storing instructions, and a processor configured to identify, in response to a user input, an object from content being displayed on the display, display, through the display, the object superimposed on an image being obtained through the camera, wherein the image includes at least part of different content being displayed through a different electronic device, receive, while the object is being displayed, information on the different content being displayed by the different electronic device from the different electronic device through the communication circuit, determine a location of the object to be included in the different content, based on the image being obtained and the information on the different content, and transmit, in response to receiving of a specified input, information on the object and information on the location so that the object is included at the location in the different content.

In various embodiments, the processor 110 of the electronic device 101 may compare the image being obtained through the camera circuit with the information on the different content to determine a size of the extracted object to be included in the different content, and transmit information which is for the extracted object and includes information on the determined size of the extracted object to the different electronic device.

In various embodiments, the electronic device 101 may further include the sensor circuit 170. The processor 110 may determine a shape of the extracted object to be included in the different content on the basis of a movement of the electronic device, obtained through the sensor circuit, and transmit information which is for the extracted object and includes information on the determined shape of the extracted object to the different electronic device.

In various embodiments, the processor 110 of the electronic device 101 may determine a size of the extracted object to be included in the different content on the basis of a user input for the image being displayed through the display, and transmit information which is for the extracted object and includes information on the determined size of the extracted object to the different electronic device.

In various embodiments, the processor 110 of the electronic device 101 may obtain a different image indicating at least part of a display of the different electronic device through the camera circuit, set a virtual identifier to an image being obtained through the camera circuit, based on the different image, and determine a location of the object to be included in the different content, based on the virtual identifier.

In various embodiments, the information on the different content may include information on a marker capable of identifying a coordinate of the different content being displayed by the different electronic device. The processor 110 of the electronic device may identify the marker at a location where the extracted object is superimposed on the image being obtained through the camera circuit, and determine a location of the object to be included in the different content by identifying information on the identified marker.

In various embodiments, the processor 110 of the electronic device 101 may identify information of the different content corresponding to the location where the extracted object is superimposed on the image being obtained through the camera circuit, based on information on the different content, extract at least part of information from information on the extracted object, based on the identified information of the different content, and transmit the extracted at least part of information to the different electronic device.

In various embodiments, the identified information of the different content may indicate a text field, and the extracted at least part of information may be information indicating a text out of the information on the extracted object.

In various embodiments, the identified information of the different content may indicate a text field, and the extracted at least part of information may be information indicating data out of the information on the extracted object.

In various embodiments, the processor 110 of the electronic device 101 may transmit the image being obtained to the server so that the location of the object to be included in the different content is determined by the server on the basis of the image being obtained and the information on the different content, allow the server to receive the information on the different content from the different electronic device, determine the location of the object to be included in the different content on the basis of the image being obtained and the information on the different content, and request the server to transmit the determined location to the different electronic device.

As described above, a method of operating the electronic device 101 according to various embodiments may include identifying, in response to a user input, an object from content being displayed in the electronic device, displaying the object superimposed on an image being obtained by the electronic device, wherein the image includes at least part of different content being displayed by a different electronic device, receiving, while the object is being displayed, information on the different content being displayed by the different electronic device from the different electronic device, determining a location of the object to be included in the different content, based on the image being obtained and the information on the different content, and transmitting, in response to receiving of a specified input, information on the object and information on the location so that the object is included at the location in the different content.

In various embodiments, the method may further include comparing the image being obtained by the electronic device with the information on the different content to determine a size of the extracted object to be included in the different content.

Information on the extracted object may include information on the determined size of the extracted object.

In various embodiments, the method may further include determining a shape of the extracted object to be included in the different content on the basis of a movement of the electronic device. Information on the extracted object may include information on the determined shape of the extracted object.

In various embodiments, the method may further include determining a size of the extracted object to be included in the different content on the basis of a user input for the image being displayed in the electronic device. Information on the extracted object may include information on the determined size of the extracted object.

In various embodiments, the method may further include obtaining a different image indicating at least part of a display of the different electronic device, setting a virtual identifier to an image being obtained by the electronic device, based on the different image, and determining a location of the object to be included in the different content, based on the virtual identifier.

In various embodiments, the information on the different content may include information on a marker capable of identifying a coordinate of the different content being displayed by the different electronic device. The method may further include identifying the marker at a location where the extracted object is superimposed on the image being obtained by the electronic device, and determining a location of the object to be included in the different content by identifying information on the identified marker.

In various embodiments, the method may further include identifying information of the different content corresponding to the location where the extracted object is superimposed on the image being obtained through the camera circuit, based on information on the different content, extracting at least part of information from information on the extracted object, based on the identified information of the different content, and transmitting the extracted at least part of information to the different electronic device.

In various embodiments, the identified information of the different content may indicate a text field, and the extracted at least part of information may be information indicating a text out of the information on the extracted object.

In various embodiments, the identified information of the different content may indicate a text field, and the extracted at least part of information may be information indicating data out of the information on the extracted object.

In various embodiments, the method may further include transmitting the image being obtained to the server so that the location of the object to be included in the content is determined by the server, allowing the server to receive the information on the different content from the different electronic device, determining the location of the object to be included in the different content on the basis of the image being obtained and the information on the different content, and requesting the server to transmit the determined location to the different electronic device.

The electronic device according to various embodiments disclosed in the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 110) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., Compact Disc Read Only Memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have an access to a device for performing an embodiment of the disclosure via an external port. In addition, an additional storage device on a communication network may have an access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. An electronic device comprising:
   a camera circuit;
   a communication circuit;
   a display;
   a memory storing instructions; and
   a processor, wherein the processor is configured to execute the stored instructions for:
   identifying, in response to a user input, an object from content being displayed on the display;
   displaying, through the display, the object superimposed on an image being obtained through the camera circuit, wherein the image includes at least part of different content being displayed through a different electronic device;
   receiving, while the object is being displayed, information on the different content being displayed by the different electronic device from the different electronic device through the communication circuit;
   determining a location of the object to be included in the different content, based on the image being obtained and the information on the different content; and
   transmitting, in response to receiving of a specified input, information on the object and information on the location so that the object is included at the location in the different content.

2. The electronic device of claim 1, wherein the processor is configured to execute the stored instructions for:
   comparing the image being obtained through the camera circuit with the information on the different content to determine a size of an extracted object to be included in the different content; and
   transmitting information which is for the extracted object and includes information on the determined size of the extracted object to the different electronic device.

3. The electronic device of claim 1, further comprising a sensor circuit,
   wherein the processor is configured to execute the stored instructions for:
   determining a shape of an extracted object to be included in the different content on the basis of a movement of the electronic device, obtained through the sensor circuit; and
   transmitting information which is for the extracted object and includes information on the determined shape of the extracted object to the different electronic device.

4. The electronic device of claim 1, wherein the processor is configured to execute the stored instructions for:
   determining a size of an extracted object to be included in the different content on the basis of a user input for the image being displayed through the display; and
   transmitting information which is for the extracted object and includes information on the determined size of the extracted object to the different electronic device.

5. The electronic device of claim 1, wherein the processor is configured to execute the stored instructions for:
   obtaining a different image indicating at least part of a display of the different electronic device through the camera circuit;
   setting a virtual identifier to an image being obtained through the camera circuit, based on the different image; and
   determining a location of the object to be included in the different content, based on the virtual identifier.

6. The electronic device of claim 1,
   wherein the information on the different content includes information on a marker capable of identifying a coordinate of the different content being displayed by the different electronic device, and
   wherein the processor is configured to execute the stored instructions for:
   identifying the marker at a location where an extracted object is superimposed on the image being obtained through the camera circuit; and
   determining a location of the object to be included in the different content by identifying information on the identified marker.

7. The electronic device of claim 1, wherein the processor is configured to execute the stored instructions for:
   identifying information of the different content corresponding to the location where an extracted object is superimposed on the image being obtained through the camera circuit, based on information on the different content;
   extracting at least part of information from information on the extracted object, based on the identified information of the different content; and
   transmitting the extracted at least part of information to the different electronic device.

8. The electronic device of claim 1, wherein the processor is configured to execute the stored instructions for:
   transmitting the image being obtained to a server so that the location of the object to be included in the different content is determined by the server on the basis of the image being obtained and the information on the different content, allowing the server to receive the information on the different content from the different electronic device, and determining the location of the object to be included in the different content on the basis of the image being obtained and the information on the different content; and requesting the server to transmit the determined location to the different electronic device.

9. A method of operating an electronic device, the method comprising:

identifying, in response to a user input, an object from content being displayed in the electronic device;

displaying the object superimposed on an image being obtained by the electronic device, wherein the image includes at least part of different content being displayed by a different electronic device;

receiving, while the object is being displayed, information on the different content being displayed by the different electronic device from the different electronic device;

determining a location of the object to be included in the different content, based on the image being obtained and the information on the different content; and transmitting, in response to receiving of a specified input, information on the object and information on the location so that the object is included at the location in the different content.

10. The method of claim 9, further comprising comparing the image being obtained by the electronic device with the information on the different content to determine a size of the extracted object to be included in the different content, wherein information on the extracted object includes information on the determined size of the extracted object.

11. The method of claim 9, further comprising determining a shape of an extracted object to be included in the different content on the basis of a movement of the electronic device, wherein information on the extracted object includes information on the determined shape of the extracted object.

12. The method of claim 9, further comprising determining a size of an extracted object to be included in the different content on the basis of a user input for the image being displayed in the electronic device, wherein information on the extracted object includes information on the determined size of the extracted object.

13. The method of claim 9, further comprising:

obtaining a different image indicating at least part of a display of the different electronic device;

setting a virtual identifier to an image being obtained by the electronic device, based on the different image; and determining a location of the object to be included in the different content, based on the virtual identifier.

14. The method of claim 9, wherein the information on the different content includes information on a marker capable of identifying a coordinate of the different content being displayed by the different electronic device, and the method further comprises:

identifying the marker at a location where an extracted object is superimposed on the image being obtained by the electronic device; and determining a location of the object to be included in the different content by identifying information on the identified marker.

15. The method of claim 9, identifying information of the different content corresponding to the location where an extracted object is superimposed on the image being obtained through a camera circuit, based on information on the different content;

extracting at least part of information from information on the extracted object, based on the identified information of the different content; and transmitting the extracted at least part of information to the different electronic device.

* * * * *